United States Patent
Vignali et al.

(10) Patent No.: US 8,955,809 B2
(45) Date of Patent: Feb. 17, 2015

(54) THREE-WAY MOUNT BRACKET FOR AIRCRAFT CABIN AIR SUPPLY SYSTEM

(71) Applicant: Hamilton Sundstrand Corporation, Windsor Locks, CT (US)

(72) Inventors: Mark Vignali, Northfield, CT (US); Brent J. Merritt, Southwick, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/705,490

(22) Filed: Dec. 5, 2012

(65) Prior Publication Data

US 2014/0151518 A1    Jun. 5, 2014

(51) Int. Cl.
*A47K 1/00* (2006.01)
*B64C 1/00* (2006.01)
*B64D 13/00* (2006.01)

(52) U.S. Cl.
CPC .. *B64C 1/00* (2013.01); *B64D 13/00* (2013.01)
USPC ..... 248/219.4; 248/557; 248/200; 248/205.1; 248/554; 244/58

(58) Field of Classification Search
USPC ........... 248/554, 555, 556, 557, 219.4, 218.4, 248/205.1, 200; 244/58, 54; 60/796, 797
See application file for complete search history.

(56) References Cited

U.S. PATENT DOCUMENTS

| | | | |
|---|---|---|---|
| 4,111,386 A * | 9/1978 | Kenigsberg et al. | 244/17.27 |
| 5,439,189 A * | 8/1995 | Wiley et al. | 244/54 |
| 5,443,229 A * | 8/1995 | O'Brien et al. | 244/54 |
| 5,483,792 A * | 1/1996 | Czachor et al. | 60/796 |
| 5,553,892 A | 9/1996 | Pitchford et al. | |
| 5,954,309 A | 9/1999 | Kato et al. | |
| 6,139,211 A | 10/2000 | Schroeder et al. | |
| 6,263,954 B1 | 7/2001 | Nakayama | |
| 6,270,051 B1 | 8/2001 | Power | |
| 6,308,915 B1 * | 10/2001 | Liston et al. | 244/54 |
| 6,581,874 B2 * | 6/2003 | Lemire et al. | 244/54 |
| 6,708,925 B2 * | 3/2004 | Udall | 244/54 |
| 6,779,755 B1 * | 8/2004 | Thomsen | 244/54 |
| 7,516,621 B2 | 4/2009 | Suttie et al. | |
| 7,637,521 B2 | 12/2009 | Grant | |
| 7,797,922 B2 * | 9/2010 | Eleftheriou et al. | 60/226.1 |
| 7,909,286 B2 * | 3/2011 | Martinez Rueda et al. | 244/58 |
| 8,104,736 B2 * | 1/2012 | Callaghan | 248/557 |
| 8,167,540 B2 | 5/2012 | Schlinker | |
| 8,172,512 B2 | 5/2012 | Short et al. | |
| 8,360,714 B2 * | 1/2013 | Otto et al. | 415/124.2 |
| 2006/0032974 A1 * | 2/2006 | Williams | 244/58 |
| 2010/0199684 A1 * | 8/2010 | Rice | 60/796 |
| 2012/0186270 A1 * | 7/2012 | Tatman et al. | 60/796 |
| 2013/0015291 A1 * | 1/2013 | DeDe et al. | 244/54 |

\* cited by examiner

*Primary Examiner* — Terrell McKinnon
*Assistant Examiner* — Monica Millner
(74) *Attorney, Agent, or Firm* — Carlson, Gaskey & Olds, PC

(57) ABSTRACT

A mount bracket for use in a cabin air supply system for an aircraft has three legs extending from a cylindrical central bore and at a first axial end of the bracket. There are two legs at an opposed second axial end. A central leg is on the first axial end, and two of the legs are positioned at each of two lateral sides at first and second ends. The legs extend to feet. Strengthening legs connect feet at each of the lateral sides, and to the central leg foot. A thickness of the strengthening legs connected to the central leg is defined as a first dimension. A distance along the first axial end between a laterally outermost portion of the feet at each of the lateral sides is defined as a second dimension. A ratio of the first dimension to the second dimension is between 0.032 and 0.037.

8 Claims, 3 Drawing Sheets

THREE-WAY MOUNT BRACKET FOR AIRCRAFT CABIN AIR SUPPLY SYSTEM

BACKGROUND OF THE INVENTION

This application relates to a mount bracket which connects components of an aircraft cabin air supply system to an aircraft frame.

Aircraft are typically provided with an air supply system which conditions and supplies air for use as cabin air. The systems typically provide an air cycle machine which includes a compressor and turbines that are utilized to condition air being supplied to the aircraft cabin. The air is supplied to the air cycle machine from cabin air compressors.

There are ducts and any number of flow manifolds as part of the cabin air supply system.

In the prior art, a plurality of mount brackets mount the entire system to an aircraft frame. One mount area includes an upper and lower mount bracket, and which connect brackets for being mounted to cabin air compressors. Another end of the upper mount bracket is connected to a forward manifold. The upper mount bracket itself is secured to an aircraft frame.

In the prior art, an upper mount bracket, which is in a vertical upper position when mounted in an aircraft, has had five bolt holes in a foot which are bolted to the forward manifold. Those feet have been separate at the end of the bracket which mounts to the forward manifold. In addition, the bolt holes have been formed as relatively simple openings.

There are concerns with regard to the strength provided by the prior art mount bracket, and the stresses it encounters.

SUMMARY OF THE INVENTION

A mount bracket for use in a cabin air supply system for an aircraft has three legs extending from a cylindrical central bore and at a first axial end of the bracket. An axial direction is defined by a central axis of the bore. There are two legs at an opposed second axial end. A central leg is on the first axial end, and two of the legs are positioned at each of two lateral sides of the central leg on each of the first and second ends. The legs extend to feet which each have a bolt hole. Strengthening legs connect the feet at each of the lateral sides, and each of the feet at the lateral sides of the first axial end to the central leg foot. A thickness of the strengthening legs connected to the central leg is defined as a first dimension. A distance along the first axial end between a laterally outermost portion of the feet at each of the lateral sides is defined as a second dimension. A ratio of the first dimension to the second dimension is between 0.032 and 0.037.

These and other features may be best understood from the following specification and drawings, the following which is a brief description.

DETAILED DESCRIPTION

Figure 1:
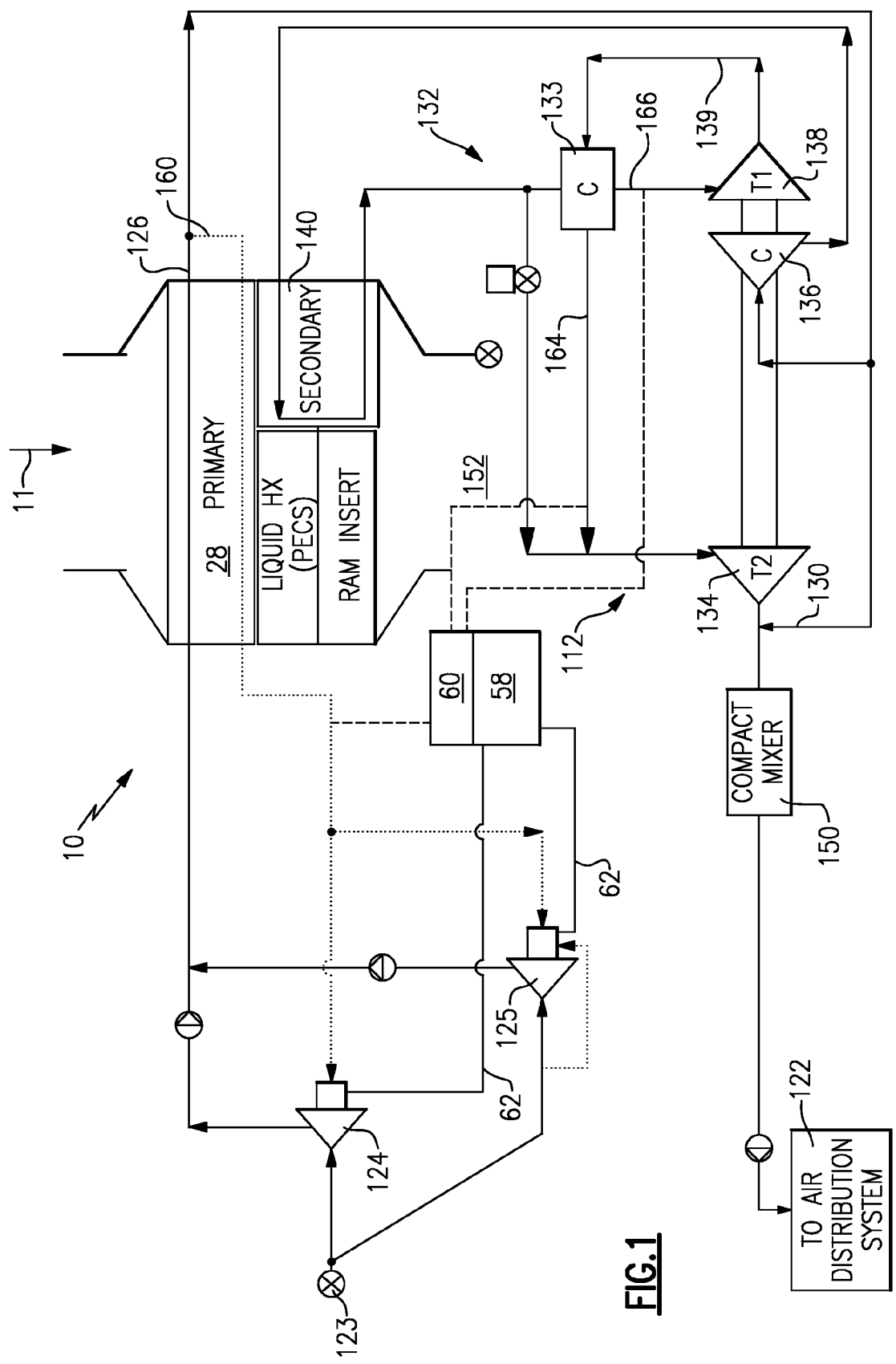
FIG. 1 schematically shows a cabin air supply system.

FIG. 1 shows cabin air supply system 10 which may be incorporated into an aircraft. A source 123 of air delivers air into a pair of cabin air supply compressors 124 and 125. The compressors 124/125 pass the air through a primary heat exchanger 28, which receives a flow of ambient air from outside of the aircraft shown schematically at 11. The air passing through the primary heat exchanger 28 moves to a supply conduit 126, and some of the air is delivered to a line 130, and then to a compact mixer 150, and to an air distribution system 122 for the aircraft. Another portion of the air is delivered to a compressor 136, and from the compressor 136 back through a secondary heat exchanger 140. Downstream of the heat exchanger 140, the air may pass to a condenser 133. The air from heat exchanger 140 passes through the condenser 133 and may drive a turbine 138, and the air downstream of the turbine 138 is returned to the condenser 133 through passage 139. The two airflow passages are maintained separate in condenser 133. Downstream of the condenser 133, the air from line 139 may pass into a line 164, leading to a second turbine 134, and then to the mixer 150. Turbines 134, 138, and compressor 136, are all part of an air cycle machine 132.

A tap 160 taps bearing cooling air for the compressors 124 and 125, as shown schematically. A mount bracket 58 is shown schematically in FIG. 1. A manifold 60 distributes air from the lines 160, 164 and 166, all of which are shown schematically by dashed lines. In general, the manifold 60 would carry a tube that would provide a portion of the lines 160, 164 and 166.

Figure 2:
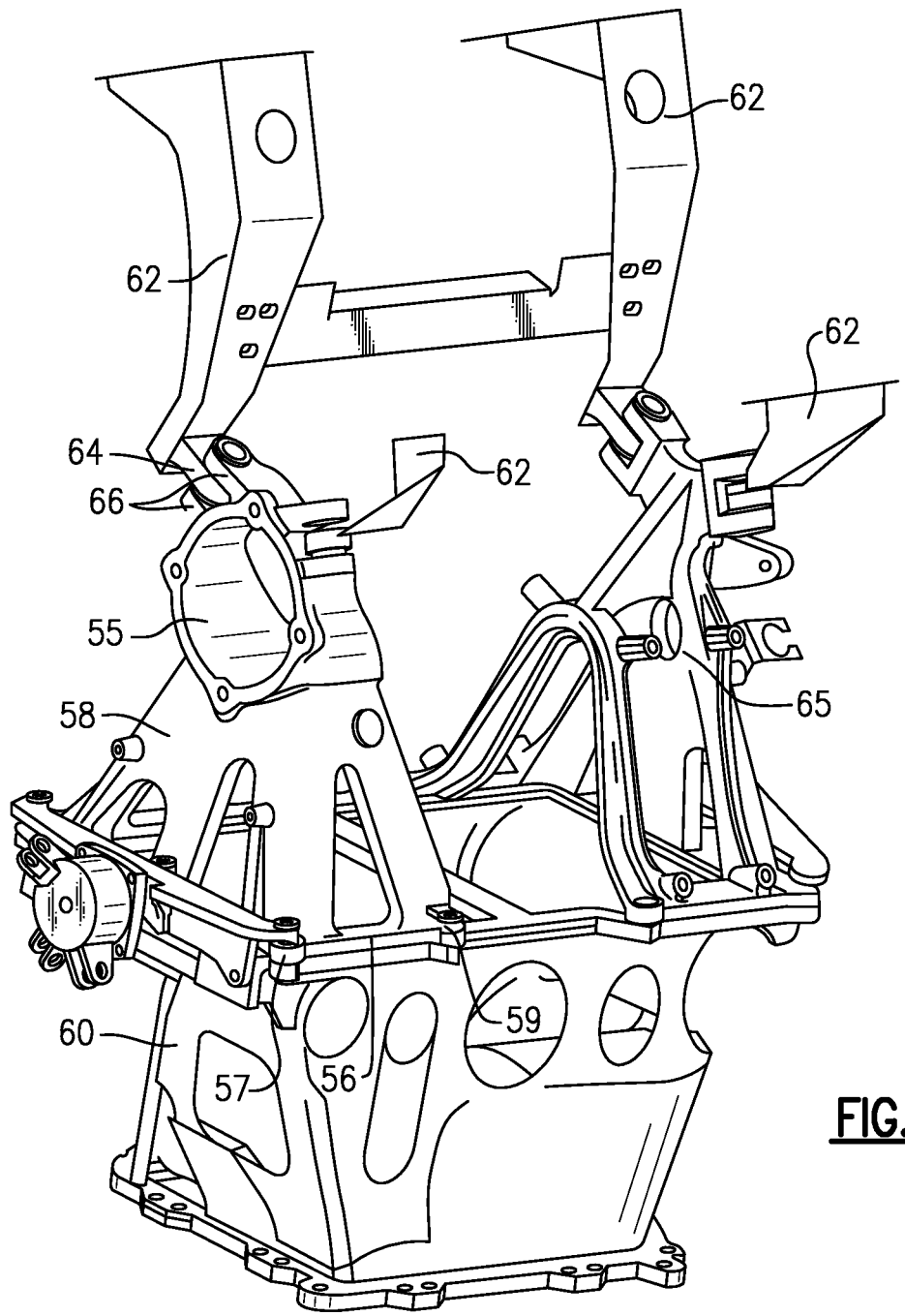
FIG. 2 is a perspective view of a detail of a mount bracket.

FIG. 2 shows brackets 62 which connect the cabin air compressors 124 and 125 to mount brackets 58 and 65. When the system is mounted in an aircraft, the bracket 58 will be vertically above the bracket 65. As shown, the cabin air compressor brackets 62 are secured through a flange 64 to ears 66 on the mount bracket 58. A central hole 55 is connected to an aircraft frame through a vibration dampening member.

The forward manifold 60 communicates with ducts to supply air. In particular, portions of passages 160, 164 and 166 (not shown) pass through the forward manifold 60.

The mount bracket 58 has bolt holes 57 and 59 shown in FIG. 2, and three other holes, which cannot be seen in this figure, which are all secured by bolts to the forward manifold 60. A reinforcing leg 56 extends between the bolt hole locations 57 and 59.

Figure 3:
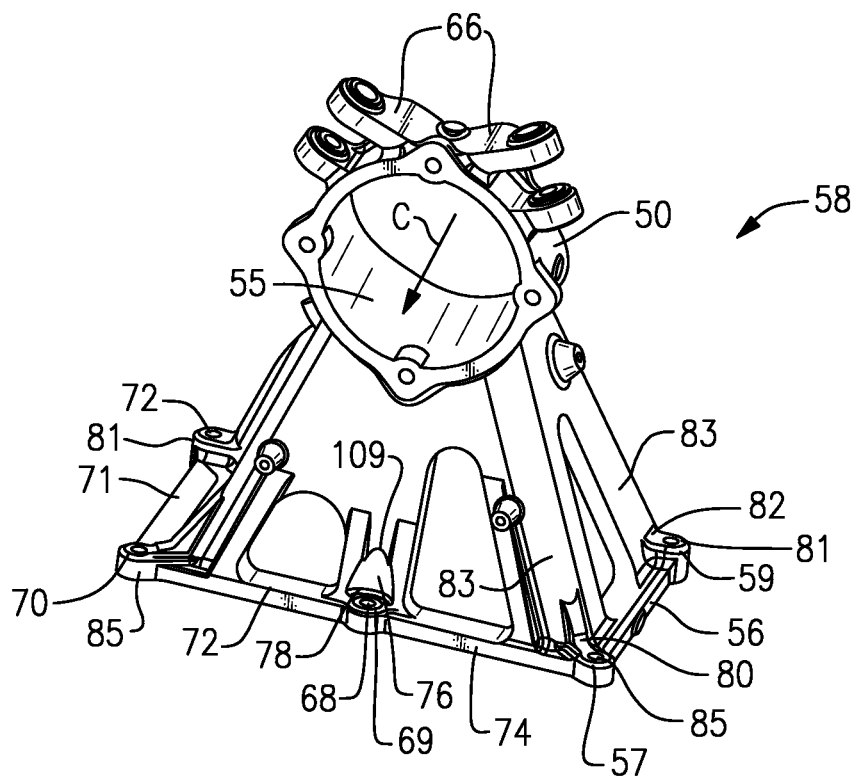
FIG. 3 is a perspective view of the mount bracket.

FIG. 3 shows mount bracket 58. As shown, there are five bolt holes, with a central forward bolt hole 68, and other side bolt hole 70 and 72, which mirror the location and configuration of the bolt holes 57 and 59. Bolt hole 72 and bolt hole 59 are formed with a fillet radius 82 that merges a leg surface 83 into a foot at flat 81. In one embodiment, the fillet radius was 0.250 inch (0.635 cm).

The bolt hole 57, and the bolt hole 70 are also formed with a fillet radius 80 which merges a side 83 of a leg into a foot flat 85 around the bolt hole 57. In one embodiment this fillet radius was 0.500 inch (1.27 cm).

The area surrounding the central hole 68 has a fillet radius 78 merging from a bolt access cutout 76 into foot flat 69 about the bolt hole 68. This fillet radius is 0.109 inch (0.277 cm). The bolt access cutout 76 is formed to a radius of 0.8125 inch (2.064 cm).

As also shown, there is a reinforcing leg 72 extending between the foot 85 with bolt hole 70 and the foot 69. Another reinforcement leg 74 extends between the foot flat 68 and the foot 85 having bolt hole 57. A leg 71 connects holes 70 and 72. As is clear from this Figure, the feet 85, 81 and 69 extend out axially beyond an outermost extent of the reinforcing legs 72, 74. The feet 85 and 81 extend laterally outwardly of reinforcing legs 71 and 56, respectively. The axial and lateral directions are defined relative to a center C of bore 55.

There is no central bolt hole or leg at an axial end of the bracket 58 spaced into the plane of FIG. 3. Moreover, the central bore 55 is spaced closer to the end receiving the center hole 68 than it is to an axial end of the mount bracket 58 having feet 81.

Figure 4:
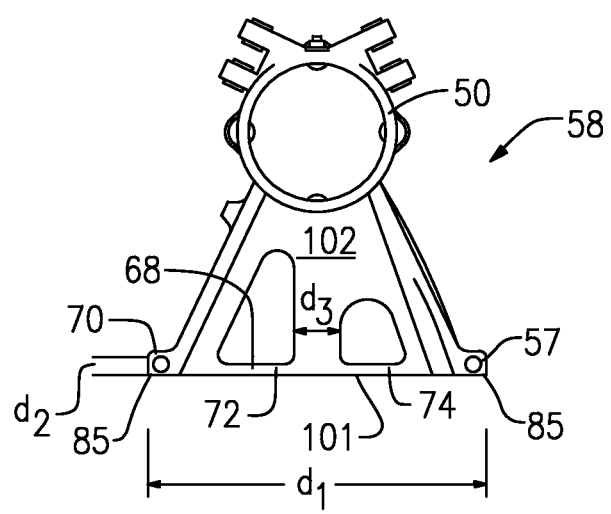
FIG. 4 is a front view of the FIG. 3 mount bracket.

As shown in FIG. 4, a thickness $d_1$ of the strengthening legs 72 and 74 is defined as a dimension extending away from a bottom surface 101. The mount bracket 58 extends from an outer dimension $d_2$ between the feet 85. A lateral thickness $d_3$ is defined for central leg 102, at an end 109 (see FIG. 3) of the bolt access cutout 76 spaced furthest from the bolt hole 68.

In embodiments, a ratio of $d_1$ to $d_2$ was between 0.032 and 0.037. A ratio of $d_1$ to $d_3$ was between 0.23 and 0.27. A diameter of the bolt holes 72, 68, and 57 was 0.406 inch (1.031 cm). The diameter of bolt hole 70 was 0.382 inch (0.970 cm). Bolt hole 59 is slotted with dimensions 0.382 inch by 0.424 inch (0.970×1.077 cm). In embodiments, a ratio of the fillet radius at the location of the holes 59 and 72 to the diameter of the bolt holes was between 0.49 and 0.74. A ratio of the fillet radius 82 at the holes 70 and 57 to the diameter of the holes was between 1.05 and 1.4. A ratio of the radius of the bolt access cutout 76 to the diameter of the bolt hole 68 is between 1.76 and 2.22. A ratio of the fillet radius 78 merging the bolt access cutout 76 into the nominal surface of the bolt hole 68 to the diameter of the bolt hole was between 0.17 and 0.37.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A mount bracket for use in a cabin air supply system for an aircraft comprising:
   three first axial end legs extending from a cylindrical central bore and at a first axial end of said bracket, with an axial direction defined by a central axis of said bore, and two second axial end legs at an opposed second axial end, with one of said first axial end legs being a central leg, and a remaining two of said first axial end legs being positioned at each of two lateral sides of said central leg with one on each of said first and second ends, said first and said second axial end legs each extending to a foot having a bolt hole, and strengthening legs connecting said feet at each of said lateral sides, and said strengthening legs connecting each of said feet at said lateral sides of said first axial end to a foot on said central leg, and a thickness of said strengthening legs connected to said feet on said central leg is defined as a first dimension, and a distance along said first axial end between a laterally outermost portion of said feet at said each of said lateral sides defined as a second dimension, and a ratio of said first dimension to said second dimension is between 0.032 and 0.037;
   a fillet radius merging said second axial end legs at said second axial end into a flat at said foot, and said bolt hole in said second axial end legs at said second axial end having a diameter, and a ratio of said fillet radius at said feet at said second axial end to said bolt hole diameter is between 0.49 and 0.74;
   a fillet radius merges one of said first axial end legs at said lateral sides, into a flat at said foot, and a ratio of said fillet radius of said feet at said lateral sides of said first axial end to a diameter of said bolt holes in said legs at said lateral side of said first axial end is between 1.05 and 1.4; and
   said central leg has a bolt access cutout cut into a face of said central leg, and at a radius, and surrounding said bolt hole associated with said central leg, and a ratio of said radius of said bolt access cutout to a diameter of said bolt hole in said central leg being between 1.76 and 2.22.

2. The mount bracket as set forth in claim 1, wherein a third dimension is a lateral length of said central leg at an end of said access cutout remote from the bolt hole, and a ratio of said first dimension to said third dimension is between 0.23 and 0.27.

3. The mount bracket as set forth in claim 2, wherein a fillet radius merges said bolt access cutout into a flat at said foot, and a ratio of said fillet radius merging said bolt access cutout into said foot to said diameter of said bolt hole in said central leg being between 0.17 and 0.37.

4. The mount bracket as set forth in claim 1, wherein said feet have an outwardly extending cylindrical surface, and said outwardly extending cylindrical surfaces extend axially away from an axial end of said feet strengthening legs at said first axial end.

5. A cabin air supply system for an aircraft comprising:
   an air cycle machine;
   a condenser, and there being two outlet lines from said condenser;
   a pair of cabin air supply compressors being mounted by brackets to a mount bracket, and said mount bracket further mounting a forward manifold, said forward manifold providing a portion of a flow line for each of said outlets of said condenser, and further receiving a portion of a flow line supplying bearing cooling air tapped from a line downstream of said pair of cabin air supply compressors back to bearings of said cabin air supply compressors, and downstream of a heat exchanger;
   said mount bracket including three legs extending from a cylindrical central bore and at a first axial end of said bracket, with an axial direction defined by a central axis of said bore, and two legs at an opposed second axial end, with a central leg on said first axial end, and two of said legs being positioned at each of two lateral sides of said central leg with one on each of said first and second ends, said legs each extending to a foot having a bolt hole, and strengthening legs connecting said feet at each of said lateral sides, and said strengthening legs connecting each of said feet at said lateral sides of said first axial end to a foot on said central leg, and a thickness of said strengthening legs connected said foot on said to central leg is defined as a first dimension, and a distance along said first axial end between a laterally outermost portion of said feet at said each of said lateral sides defined as a second dimension, and a ratio of said first dimension to said second dimension is between 0.032 and 0.037;
   a fillet radius merging said legs at said second axial end into a flat at said foot, and said bolt hole in said legs at said second axial end having a diameter, and a ratio of said fillet radius at said legs at said second axial end to said bolt hole diameter is between 0.49 and 0.74;
   a fillet radius merges one of said legs at said lateral sides, and at said first axial end into a flat at said feet, and a ratio of said fillet radius of said feet at said lateral sides of said first axial end to a diameter of said bolt holes in said legs at said lateral side of said first axial end is between 1.05 and 1.4; and
   said central leg has a bolt access cutout cut into a face of said central leg, and at a radius, and surrounding said bolt hole associated with said central leg, and a ratio of said radius of said bolt access cutout to a diameter of said bolt hole in said central leg being between 1.76 and 2.22.

6. The system as set forth in claim 5, wherein a third dimension is a lateral length of said central leg at an end of said access cutout remote from the bolt hole, and a ratio of said first dimension to said third dimension is between 0.23 and 0.27.

7. The system as set forth in claim 6, wherein a fillet radius merges said bolt access cutout into a flat at said foot, and a ratio of said fillet radius merging said bolt access cutout into said foot to said diameter of said bolt hole in said central leg being between 0.17 and 0.37.

8. The system as set forth in claim 5, wherein said feet have an outwardly extending cylindrical surface, and said outwardly extending cylindrical surfaces extend axially away from an axial end of said strengthening legs at said first axial end.

* * * * *